United States Patent
Sundaram P et al.

(10) Patent No.: US 9,165,145 B2
(45) Date of Patent: Oct. 20, 2015

(54) EFFICIENTLY SEGREGATING DATA FROM EXTERNALLY ACCESSIBLE SYSTEMS

(71) Applicants: Meenakshi Sundaram P, Walldorf (DE); Volker Hein, Plankstadt (DE); Tobias Haak, Hockenheim (DE)

(72) Inventors: Meenakshi Sundaram P, Walldorf (DE); Volker Hein, Plankstadt (DE); Tobias Haak, Hockenheim (DE)

(73) Assignee: SAP SE, Walldorf (DE)

( * ) Notice: Subject to any disclaimer, the term of this patent is extended or adjusted under 35 U.S.C. 154(b) by 178 days.

(21) Appl. No.: 13/794,437

(22) Filed: Mar. 11, 2013

(65) Prior Publication Data

US 2014/0259177 A1  Sep. 11, 2014

(51) Int. Cl.
  G06F 21/60 (2013.01)
  G06F 21/62 (2013.01)
  H04L 29/06 (2006.01)

(52) U.S. Cl.
  CPC ............ G06F 21/60 (2013.01); G06F 21/6218 (2013.01); H04L 63/0209 (2013.01); *G06F 2221/2149* (2013.01)

(58) Field of Classification Search
  CPC ............... G06F 21/60; G06F 21/6218; G06F 2221/2149; H04L 63/0209
  USPC ........ 726/4, 11, 12, 14, 26–30; 713/152, 153, 713/182, 193; 707/781, 783, 784, 705; 709/219, 225, 226, 203
  See application file for complete search history.

(56) References Cited

U.S. PATENT DOCUMENTS

| | | | |
|---|---|---|---|
| 6,377,993 B1 * | 4/2002 | Brandt et al. | 709/227 |
| 6,615,253 B1 * | 9/2003 | Bowman-Amuah | 709/219 |
| 2003/0177384 A1 * | 9/2003 | Jones et al. | 713/201 |
| 2007/0266159 A1 * | 11/2007 | Doppelhamer et al. | 709/226 |
| 2010/0049698 A1 * | 2/2010 | Klensch et al. | 707/3 |
| 2010/0131616 A1 * | 5/2010 | Walter et al. | 709/219 |
| 2010/0169268 A1 * | 7/2010 | John et al. | 726/4 |
| 2010/0250648 A1 * | 9/2010 | Cao et al. | 709/219 |
| 2012/0144404 A1 * | 6/2012 | Cipresso et al. | 719/314 |
| 2013/0046894 A1 * | 2/2013 | Said et al. | 709/226 |
| 2014/0006368 A1 * | 1/2014 | Moser et al. | 707/705 |

* cited by examiner

*Primary Examiner* — Shanto M Abedin
(74) *Attorney, Agent, or Firm* — Schwegman Lundberg & Woessner, P.A.

(57) ABSTRACT

Various embodiments herein include at least one of systems, methods, and software that efficiently segregate data from externally accessible systems. One such embodiment is a method performed by a first data processing system and includes receiving a call from a client of a user interaction service requesting data to populate a client application user interface. Next, a first object service obtains the requested data. The first object service is then executed to call a master data service to retrieve master data from a local database storing master data copied from master data stored by a second data processing system. Next, transaction data is retrieved via a remote service call over a network from the second data processing system. The retrieved data is then provided back to the calling user interaction service, which then transmits the data to the client application.

16 Claims, 3 Drawing Sheets

EFFICIENTLY SEGREGATING DATA FROM EXTERNALLY ACCESSIBLE SYSTEMS

BACKGROUND INFORMATION

Organizations that provide online business systems typically do not want to store transaction data in areas that are less secure, such as outside of a firewall in a demilitarized zone (DMZ). At the same time, organizations do not want to develop parallel systems where one executes inside a firewall and the other outside a firewall in a DMZ. Further, even when an entity maintains systems on each side of a firewall, a system that accesses data inside the firewall from the DMZ, such data access is generally in efficient.

DETAILED DESCRIPTION

Figure 1:
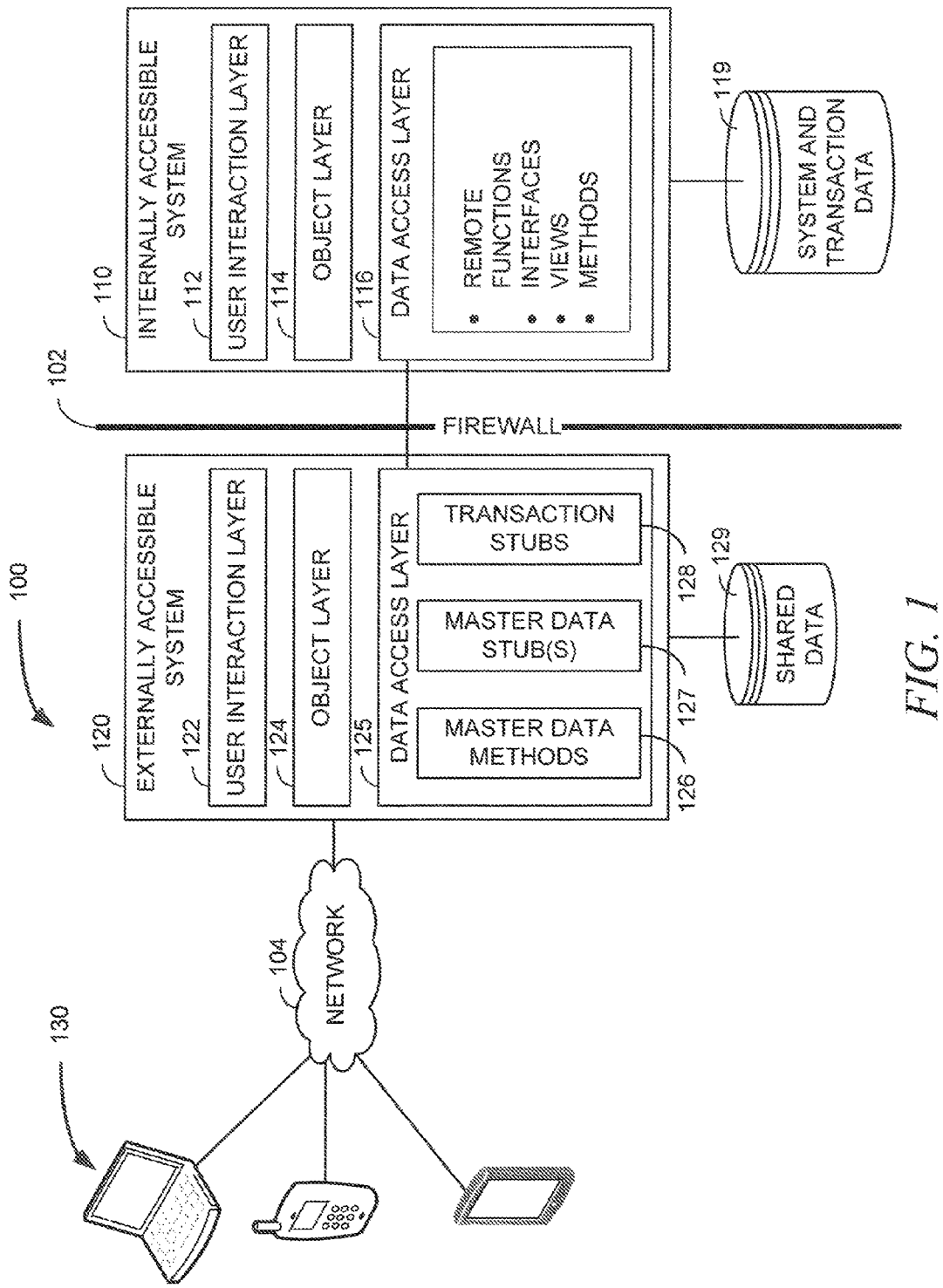
FIG. 1 is a logical block diagram of a system, according to an example embodiment.

Various embodiments illustrated and described herein include at least one of systems, methods, and software that efficiently segregate data from externally accessible systems. Such embodiments include storing data inside a firewall that is accessible via application services callable from outside of the firewall. However, simply providing services callable across a firewall may create performance issues. Thus, the various embodiments herein include additional elements to not only provide secure storage of transaction data, but to also provide efficiencies in data access and application development, maintenance, and training.

When providing access to perform data processing activities to users outside of an organizational firewall, such as through the Internet, organizations typically deploy applications outside of the firewall in a DMZ that are distinct from applications deployed inside the firewall. This results in additional development, maintenance, and training cost and effort. Rather than duplicating such applications and associated functionality, some embodiments herein provide solutions where a single application may be deployed on both sides of the firewall. In such embodiments, an application deployed inside the firewall stores both transaction and master data, such as may be stored in one or more underlying databases. The master data is replicated to the application instance outside of the firewall, such as on an ad hoc or scheduled basis. Transaction data is then made available by the application instance inside the firewall to the application instance outside the firewall via one or more services. Such services are callable by the application instance outside of the firewall.

Transaction data is generally data involved in business processes. For example, customer information, leads, activities, opportunities, contracts, quotations, orders, invoices, appointments, customer account notes, product information, and other such data. Other data is generally referred to as master data. Master data is data that may be descriptive of codes stored to represent other data, such as data that is displayed in user interfaces to give meaning to users when viewing the data which may include country and state codes, postal codes, tax codes, and the like. Master data may also include other data such as product and service descriptions, user interface elements whether graphical or textual, and other such data that is not specific to a particular customer, employee, department, product, service, or transaction. Master data can generally be considered data that is not specifically transaction data but may be referenced by and give meaning to stored transaction data. Master data may further be data that is user interface related, such as language or geographic localizing where an application that consumes the data may be utilized in different geographic areas and in different languages.

As mentioned, transaction data is made available by the application instance inside the firewall to the application instance outside the firewall via one or more services. Some such services are tailored to minimize a number of network transactions needed for the application instance outside of the firewall to access data. For example, common data tasks may include dedicated services. In particular, common data tasks that may operate against different levels of data in a process may consume various data elements, the identification of which is dependent on received input. To reduce a number of network and database transactions needed to obtain data that is need and might be needed, some such services may retrieve both data that will be needed and might be needed. Further, certain services may be tailored to generation of specific document types, such as opportunities, leads, activities, orders, invoices, scheduled events, and other events, document types, transaction types, and the like. For example, instead of generating a document or transaction by communicating data for storage in multiple steps, such services operate to receive or provide data of the particular task in one instance. Efficiencies in reducing a number of database transactions and network transactions are thereby provided. These efficient services may be provided by the application deployed inside the firewall for utilization by the application deployed outside the firewall. However, the same services may be utilized by the application inside the firewall.

In some embodiments, the application instances deployed on each side of the firewall are generally identical, although configured in part differently. For example, the application instance deployed inside the firewall may be configured to access data directly from one or more underlying databases. The application instance deployed outside the firewall will be configured to access transaction data via the data access services provided by the application instance deployed inside the firewall. Further, the application instance deployed outside the firewall may be configured to update or receive updates with regard to the master data that are stored locally to the application instance outside the firewall. Such configurations between the two application instances may be employed in different ways in various embodiments. For example, configuration settings may be set in each application instance, different data access modules may be deployed to each application instance, and other such solutions. Such solutions are employed to cause the application instance deployed inside the firewall to access transaction data from one or more underlying databases and to cause the application instance deployed outside the firewall to access transaction data via services of the application instance deployed inside the firewall.

Although the application instances are instances of the same application, the applications may include some further differences, such as different modules tailored to differences in computing environments and for different client-types used to access the respective application instances. For example, the application may be a Customer Relationship Management (CRM) application deployed as an instance inside a firewall and an instance outside the firewall. The CRM application instance inside the firewall may be accessed via thick clients and a web browser-based client. The CRM application instance outside of the firewall may be accessed via a web browser-based client and mobile device apps. As the client-types used to access the CRM application instances differ, the CRM application instances may vary to accommodate such differences. However, the application instances are functionally identical in such embodiments.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 is an example of a computing environment within which data may be efficiently segregated from externally accessible systems, such as to provide an application instance deployed outside of a firewall in a DMZ access to transaction data stored and maintained securely by another application instance inside the firewall.

The system 100 is a networked computing environment that includes two application instances that communicate over a network across a firewall 102. The application instances include an internally accessible system 110 and an externally accessible system 120.

The internally accessible system 110 and externally accessible system 120 are each typically deployed on distinct computing hardware. Such hardware typically includes a server-class computing device, such as is illustrated in and described with regard to FIG. 3. The internally accessible system 110 is deployed on an internal, organization-side of the firewall 102. The externally accessible system 120 is deployed on an external, typically Internet-side of the firewall 102.

The references to internally and externally accessible refer to a side of the firewall 102 on which the internally accessible system 110 and externally accessible system 120 are deployed. Internally accessible refers to the internally accessible system 110 being deployed on an internal network of an organization that is protected from network traffic outside of the internal network by the firewall 102. The firewall 102 is configurable to block certain types of network traffic and network traffic from particular sources, to filter network traffic, to perform threat mitigation, to perform intrusion detection, and other such network security related functions. Externally accessible refers to the externally accessible system 120 being deployed outside of the internal network of the organization on an opposite side of the firewall 102 from the internally accessible system 110. The externally accessible system 120 is also connected to another network 104, such as the Internet. In some embodiments, although not illustrated, an additional firewall maybe located between the externally accessible system 120 and the network 104. This additional firewall, when present, is typically configured differently from the firewall 102. For example, the additional firewall may be configured to allow unauthenticated users to access the externally accessible system 120, although the externally accessible system 120 may include its own user authentication functionality. Further, the additional firewall will typically be configured to a lower security level than the configuration of the firewall 102.

The internally accessible system 110 typically provides access and functionality to internal users through client computing devices connected to the internally accessible system 110 via an internal network of the organization. The internal network typically includes a Local Area Network (LAN), but may also include other network types such as a Virtual Private Network, a System Area Network (SAN), and other such networks.

The externally accessible system 120 typically provides access and functionality to external users through client computing devices 130 that connect via the network 104. The external users may be organization employees connecting while outside of an organization facility. The external users may also include business partners, customers, clients, contracted service providers, logistics providers, among other possible users depending on the organization and the particular embodiment. The client computing devices 130 may include various device types, such as personal computers, smartphones, networked media players, tablets, set top boxes, automobiles information center computing devices, and other such devices. Such devices may connect and interact with the externally accessible system 120 through one or more of web browsers or thin or thick client device 130 apps and applications.

In some embodiments, the internally accessible system 110 and externally accessible system 120 may be separate instances of the same application, although configured differently. For example, each of the internally accessible system 110 and externally accessible system 120 may be instances of the same CRM application, Enterprise Resource Planning (ERP) application, or other application. Although the internally accessible system 110 and externally accessible system 120 may be instances of the same application, each may be configured distinctly. For example, the internally accessible system 110 is configured to enable internal client connectivity and to access system and transaction data 119 stored inside the firewall 102. Such data includes transaction data and master data. The internally accessible system 110 is also typically configured to utilize its own object layer 114 and data access layer 116 to perform data processing functions and data access. Conversely, the externally accessible system 120 is configured to enable external client connectivity, to access master data stored in a shared data database 129, and to access data stored and maintained by the internally accessible system 110 via one or more internally accessible system 110 services callable across the firewall 102. The externally accessible system 120 may also be configured in some embodiments to access functionality of the internally accessible system 110 via one or more additional internally accessible system 110 services callable across the firewall 102.

For example, each of the internally accessible system 110 and externally accessible system 120 may include respective user interaction layers 112, 122, object layers 114, 124, and data access layers 116, 125. The user interaction layers 112, 122 provide interfaces through which client apps and application access the respective systems 110, 120. The object layers 114, 124 include objects that perform data processing activities and provide data access to the interaction layers 112, 122. The data access layers 116, 125 provide objects in the object layers 114, 124 access to stored data and services provided by underlying one or more underlying databases, such as stored procedures, remote functions, data views, and the like.

With regard to the internally accessible system 110, the user interaction layer 112 is configured to provide access to client types deployed on computing devices of internal users, such as typically connect via a LAN. The object layer 114 generally includes objects that are fully functional and access data through the data access layer 116. The data access layer 116 generally provides data access to the object layer 114 objects with regard to data and services such as stored in the system and transaction data 119 inside the organization's firewall 102.

In some embodiments, one or both of the object layer 114 and data access layer 116 may include services opened for access across the firewall 102. Such services accessible across the firewall 102 may expose data and functional services of the internally accessible system 110 to the externally accessible system 120. The externally accessible system 120 in such embodiments may therefore not store the data or access data in performance of certain functions and data processing activities.

Such services may be chosen to be exposed for different purposes. For example, both of the internally and externally accessible systems 110, 120 generally operate against the same data. By exposing such data access services, the data does not need to be replicated between the systems 110, 120, which can be a time consuming, network intensive, and complicated ongoing process. Further, the organization, by storing the data within the firewall 102 has greater security control over the data. Similarly, certain data may be quite sensitive and transmitting the data across the firewall 102 into the DMZ for processing may expose the sensitive data to comprise. Additionally, some data processing activities that may be performed by objects in the object layer 114 may be performed against large datasets. Transmitting large datasets across the network for processing within the externally accessible system 120 may be impractical, degrade performance of both systems 110, 120, and increase network latency. Thus, the externally accessible system 120 object layer 124 and data access layer 125 may be configured to access services of the internally accessible system 110.

With regard to the externally accessible system 120, the user interaction layer 122 is configured to provide access to client types deployed on computing devices of external users that connect via the network 104. The object layer 124 generally includes objects that are functional and access data through the data access layer 116. However, some objects in the object layer 124 may instead be configured to access one or more services of the object layer 114 or data access layer 116 of the internally accessible system 110. Such configurations may be made through manipulation of configuration settings of the externally accessible system 120 that are consumed by object layer 124 or objects therein in determining how to execute. In other embodiments, objects deployed in the object layer 124 or the entire object layer 124 may be interchangeable alternates of the application that is deployed on both sides of the firewall 102.

The data access layer 125 generally provides data access to object layer 124 objects. In some embodiments, the data access layer 125 provides access to master data stored in the shared data database 129 or other database also deployed within the DMZ and not inside the firewall 102. The master data is typically accessible via the data access layer 125. The data access layer 125 may include one or more master data methods 126 that may be called by objects layer 124 objects. However, in some embodiments, the master data methods 126 may be called directly from the user interaction layer 122, such as when data options to populate a user interface form are needed from the master data. Regardless of where the master data methods 126 are called from, the master data methods 126 are executable to retrieve and provide master data to the calling process, object, or other executable code element.

The master data stored in the shared data database 129 is typically replicated from master data stored in the system and transaction data 119 of the internally accessible system 110. The master data may be replicated on an ad hoc basis as needed or replicated on a scheduled periodic basis. The replication of master data may be performed by a process within the firewall 102 that pushes master data to the shared data database 129. In other embodiments, the master data may be replicated through one or more master data method stubs 127 that are callable within the data access layer 127. Such as master data method stub 127 is typically a small object that is callable within the data access layer and may accept one or more arguments. However, the master data method stub 127 operates to forward the call to a corresponding method that is present somewhere else, such as within the data access layer 116 of the internally accessible system 110. There after the called master data method is performed, a master data update is received by the master data method stub 127 and the data is stored to the appropriate location, such as the shared data database 129.

The data access layer 125 of the externally accessible system 120 also provides access to transaction data. However, the transaction data is not stored within the DMZ, outside of the firewall 102. Instead, the transaction data is stored internal to the firewall 102, such as within the system and transaction data 119 of the internally accessible system 110. The data access layer 125 is configured in some embodiments to access transaction data via one or more services provided by the data access layer 116, object layer 114, or by a database management system within which the system and transaction data 119 may be stored.

In some embodiments, object layer 124 objects, when executed, call certain methods within the data access layer to perform data access procedures. In some such embodiments, these methods are configured to operate as method stubs. These method stubs are reflected in the data access layer 125 as transaction stubs 128. The transaction stubs 128 operate to receive the method call and forward the method call to an internally accessible system 110 service provided by the data access layer 116, object layer 114, or by a database management system within which the system and transaction data 119 may be stored. A response to the forwarded method call may be received by the calling transaction stub 128 and forwarded to a source of the method call, such as an object layer 124 object. The transaction stubs 128, in such embodiments, therefore appear within the externally accessible system 120 as if the data they are providing is resident within the externally accessible system 120 although the data is stored elsewhere. Transaction stubs 128 within the data access layer 125 will typically correspond to and be callable in an identical manner as methods of the data access layer 116 of the internally accessible system 110. As a result, object layer 124 objects of the externally accessible system 120 in some embodiments may be identical to object layer 114 objects of the internally accessible system 110. In some embodiments, methods callable within the internally accessible system 110 and the externally accessible system 120 are identical, but operate differently as describe above with regard to transaction stubs 128 in the externally accessible system 120 based on one or more configuration settings.

Figure 2:
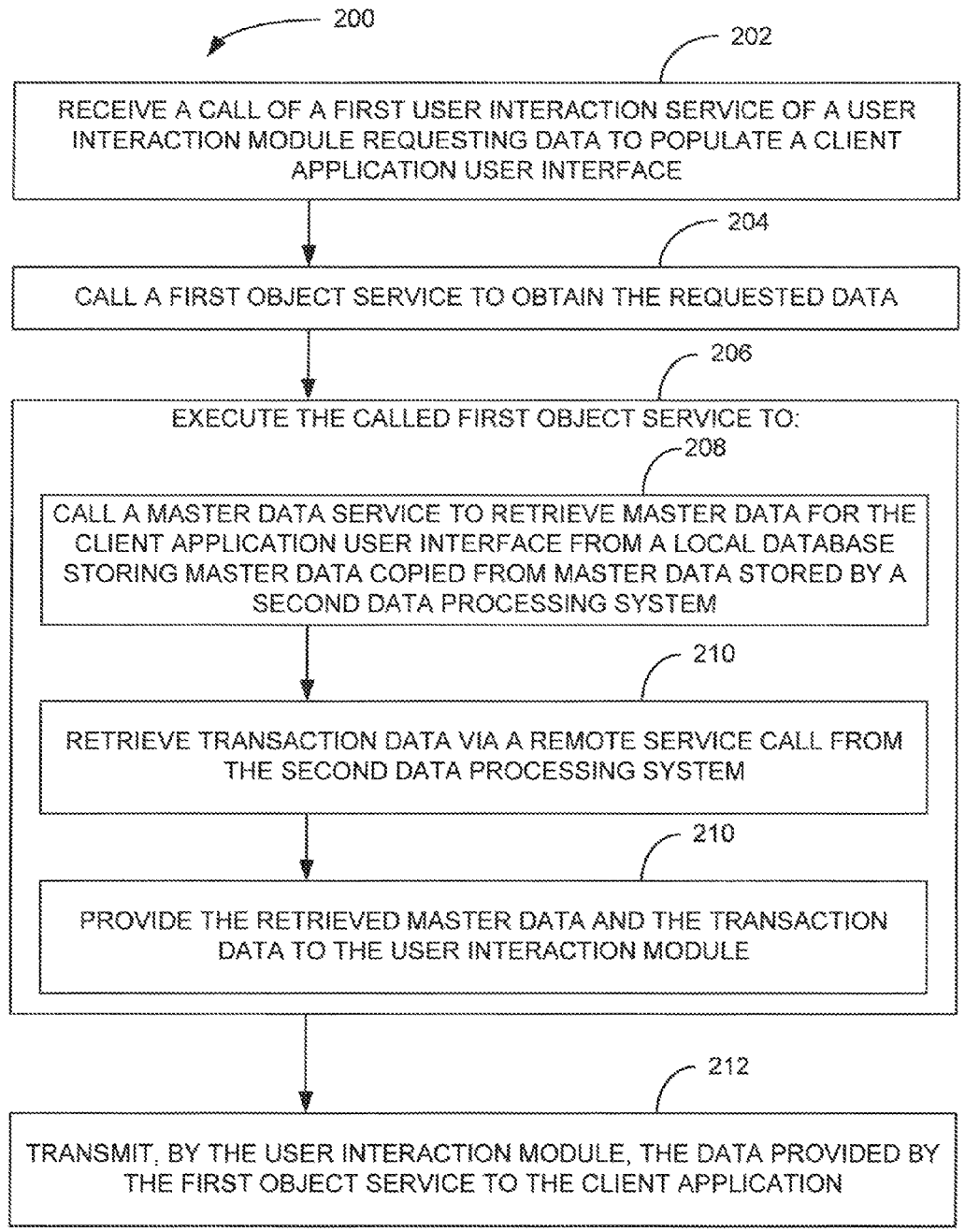
FIG. 2 is a block flow diagram of a method, according to an example embodiment.

FIG. 2 is a block flow diagram of a method 200, according to an example embodiment. The method 200 is an example of a method that may be performed within an externally accessible system 120 of FIG. 1. The method 200 is provided as an example of how the externally accessible system 120 may operate and variations hereto are possible in whole or in part. Further, some embodiments may perform only portions of the illustrated and described method 200.

In some embodiments, the first data processing system that performs the method 200 and the second data processing system are distinct instances of the same data processing system. In some such embodiments, the first data processing is configured to access transaction data stored in the second data processing system via remote service calls over the network. Further, the second data processing system may be configured to access the transaction data stored by the second data processing system, such as in one or more databases. However, in other embodiments, the first and second data processing systems may be different applications, but operate to provide access (i.e., create, read, update, delete access) to the same data as otherwise described herein that may be stored in a database that is part of or implemented with the second data processing system.

The example method 200 is performed by a first data processing system, such as the externally operated system 120 of FIG. 1. The method 200 also references a second data processing system, which in some embodiments, may be the internally accessible system 110 also of FIG. 1. The method 200 includes receiving 202, from a client application via a network, a call of a first user interaction service of a user interaction module. The received 202 first user interaction service call is requesting data to populate a client application user interface. The method 200 may then call 204 a first object service to obtain the requested data. The first object service that is called 204 may be identified based on one or more of the called user interaction service, the requested data, and the client application user interface to be populated with data. The method 200 continues by executing 206 the called 204 first object service In some embodiments, executing 206 the called 204 first object service includes calling 208 a master data service to retrieve master data for the client application user interface. The master data may be retrieved from a local database storing master data. The master data stored in the local database may have been copied from master data stored by a second data processing system.

In some embodiments, executing 206 the called 204 first object services further includes retrieving 210 transaction data via a remote service call over a network from the second data processing system. When making the remote service call to retrieve 210 the transaction data, the method 200 may include generation of a data structure including retrieval argument data included in the received 202 call of the first user interaction service. The data structure may further be generated in a form expected by the remote service being called. Once the data structure is generated, the data structure may be further processed such as to encrypt the data structure for transport of the network, encoding the remote service call according to a prescribed protocol over which communication with the second data processing system is to be conducted such as a remote function call protocol, and other processing. When the further processing, if any, is completed, the remote service call may be made by submitting the remote service call over the network to the second data processing system.

In response to the remote service call, the requested data will be received. The requested data may be received in an encrypted form, which will be decrypted. The requested data may also need to be transformed into a format consumable by other portions of the first data processing system, such as by extracting the requested data from a received data structure. Once the received data is in a suitable form, the method 200 then provides 210 the retrieved master data and the transaction data to the user interaction module. The user interaction module will then transmit 212 the data to the client application.

Although the method 200 is described in the context of data retrieval, the method 200 may be similarly performed to create, update, or delete data as received from a client application in the first data processing system via one or more remote service calls to the second data processing system. Further, some such remote service calls are specific to particular data processing actions to be performed, to specific user interfaces of the client application, to specific documents to be created, viewed, or modified, and other such specific purposes.

In some embodiments of the method 200, the first data processing system includes functionality to authenticate user identities and permissions. Further, when an authenticated user requests data or submits data to be stored, the data structure generated for transport over the network in with a remote service call may be generated to include data representative of user credentials to authenticate the remote service call within the second data processing system. In some embodiments, credential data of the user may be added to the data structure. In other embodiments, as the user has already be authenticated within the first data processing system, data of a generic user credential can be added to the data structure. In either of such embodiments, the user credential added will be evaluated by the second data processing system to ensure the remote service call is being received in response to input from an authorized user.

Another embodiment of the method 200 may further include receiving, from the client application, a second user interaction service call of another service. The user interaction service call in this embodiment includes an update to the transaction data transmitted to the client application. In response, at least a portion of the received second user interaction service call may be forwarded to a second object service. The forwarded portion of the call typically includes data representative of the update to the transaction data. The second object service may be identified based on at least one of the called user interaction service, the updated data, and the client application user interface within which the data was updated. In some embodiments, the second object service may be identified in the received call. The second object service may then be executed. Executing the second object service may include calling a second remote service to perform the data update.

In some embodiments of the method 200, the user interaction service call received 202 from a client application may include a data element indicating master data to be presented in the user interface has been cached by the client application. Such a data element informs the first object service not to call the master data service and not to provide the master data to the user interaction module for transmission 212 back to the client application.

Figure 3:
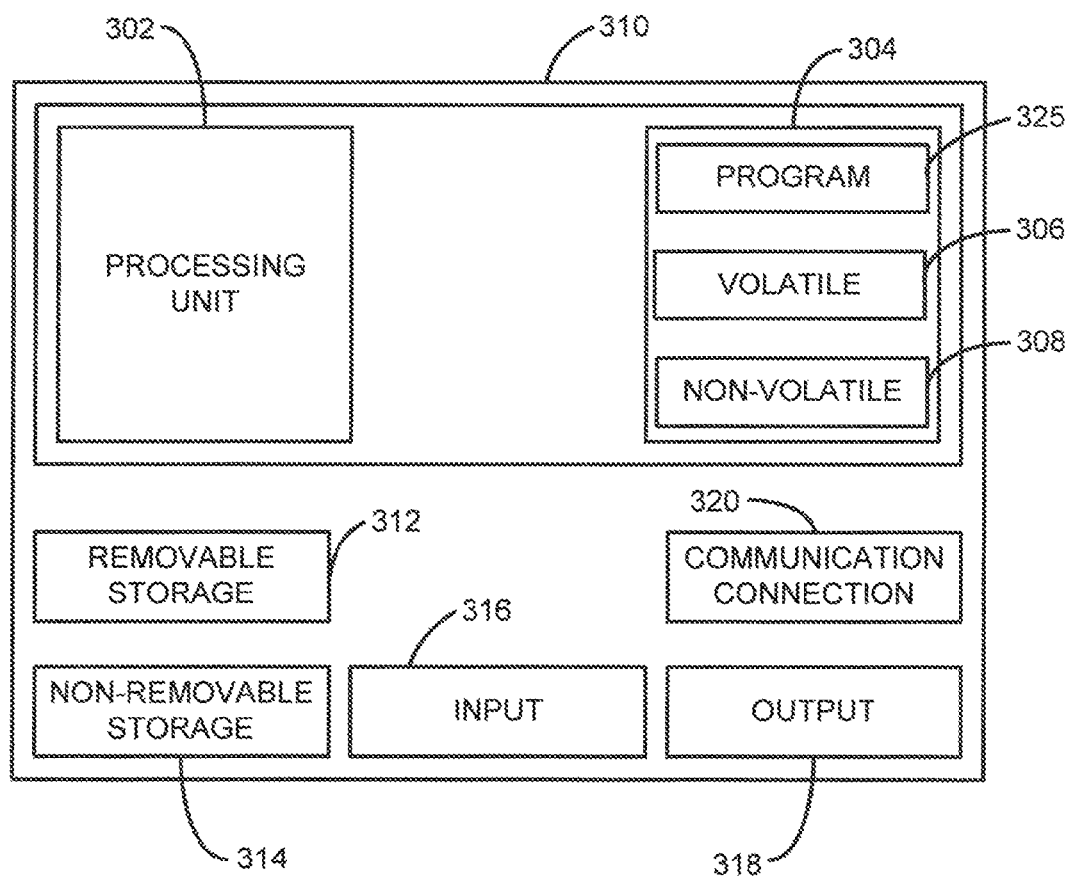
FIG. 3 is a block diagram of a computing device, according to an example embodiment.

FIG. 3 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 310, may include a processing unit 302, memory 304, removable storage 312, and non-removable storage 314. Although the example computing device is illustrated and described as computer 310, the computing device may be in different forms in different embodiments. For example, the computing device may instead be a server-class computing device, a smartphone, a tablet, or other computing device including the same or similar elements as illustrated and described with regard to FIG. 3. Further, although the various data storage elements are illustrated as part of the computer 310, the storage may also or alternatively include cloud-based storage accessible via a network, such as the Internet.

Returning to the computer 310, memory 304 may include volatile memory 306 and non-volatile memory 308. Computer 310 may include—or have access to a computing environment that includes a variety of computer-readable media, such as volatile memory 306 and non-volatile memory 308, removable storage 312 and non-removable storage 314, and cloud-based storage. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 310 may include or have access to a computing environment that includes input 316, output 318, and a communication connection 320. The input 316 may include one or more of a touchscreen, touchpad, mouse, keyboard, camera, and other input devices. The computer may operate in a networked environment using a communication connection 320 to connect to one or more remote computers, such as database servers, web servers, and other computing devices. An example remote computer may include a personal computer (PC), server, muter, network PC, a peer device or other common network node, or the like. The communication connection 320 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 302 of the computer 310. A hard drive (magnetic disk or solid state), CD-ROM, and RAM are some examples of articles including a non-transitory computer-readable medium. For example, various computer programs or apps, such as one or more applications and modules implementing one or more of the methods illustrated and described herein or an app or application that executes on a mobile device or is accessible via a web browser, may be stored on a non-transitory computer-readable medium.

Another embodiment is in the form of a system. The system of this embodiment includes at least one processor, at least one memory device, and at least one network interface device. Stored on the at least one memory device (i.e., volatile or non-volatile memory, a disk or solid state hard drive, flash memory, and the like) are a database storing master data and elements of a first data processing system. The first data processing system typically includes a set of modules or other executable program elements. The modules may include a data access module, an object module, and an interaction module, among others. Further, in some embodiments, the functions of the modules may be condensed into fewer modules or spread across a greater number of modules.

The data access module generally provides data services to other modules. Such data services may include a master data service and at least one transaction data service. The master service to provide master data retrieved from the database in response to requests from the other modules. The at least one transaction data service is executable to receive data access requests calling modules. A data access request may include a request to create, read, update, or delete data. In response to such a data access request, the at least one transaction data service may generate and submit, via the at least one network interface device, a data access call to a data service of a second data processing system. The second data processing system, in such embodiments, maintains transaction data. In response to the data access call to the data service of the second data processing system, the at least one transaction data service receives, via the at least one network interface device, a response to the submitted data call and provide a response to the another module based on the received response. The response in most instances will be provided to the calling module or service therein.

The object module, in some embodiments, contains a set of objects. Each object typically includes at least one object service accessible by other modules. For example, one such service of an object may be an object service, which when called, provides transaction data access by calling a transaction data service.

The user interaction module, in some embodiments, services user interactions, such as may be received via the at least one network interface device from client applications. The user interaction module may be responsive to a user interaction request for master data retrieved via the master data service of the data access module. The user interaction module is also typically responsive to user interaction requests with regard to transaction data by calling object services of objects.

In some such embodiments, the first data and second data processing systems consist essentially of identical modules except for transaction data services of their respective data access modules. For example, the at least one transaction data service of the first data processing system may be configured to access transaction data via at least one data access service of the second data processing system, such as by making a remote function call. Further in such embodiments, the transaction data services of the second data processing system may be configured to access transaction data stored in at least one transaction data database that is local to the second data processing system.

In a typical computing environment of such embodiments, the first data processing system and the second data processing system are deployed on opposite sides of a firewall. Further, although the first and second data processing systems consist essentially of identical modules, in some embodiments the differences between the systems may include the first data processing system including at least one additional module not included in the second data processing system. For example, such an additional module may be included in the first data processing system to service interactions with at least one Internet-specific client type. Such an Internet specific client type may be one or more of a mobile device (i.e., smartphone or tablet) app and a web browser based app. The additional module, in some such embodiments, may include a web server that receives and services client interactions with the first data processing system.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A system comprising:
   at least one processor, at least one memory device, and at least one network interface device;
   a database stored on the at least one memory device, the database storing master data, the master data being data that is not transaction data but is referenced by transaction data to give meaning to the transaction data;
   a first data processing system including a set of modules stored on the at least one memory device and executable by the at least one processor, the set of modules including:
      a data access module providing data services to other modules, the data services including:
         a master data service to provide master data retrieved from the database in response to requests from the other modules; and
         at least one transaction data service to receive a data access request from a calling module, generate and submit, via the at least one network interface device, a data access call to a data service of a second data processing system that maintains transaction data, receive, via the at least one network interface device, a response to the submitted data call, and provide a response to the calling module based on the received response;
      an object module maintaining a set of objects, each object including at least one object service accessible by other modules, the at least one object service providing transaction data access by calling the at least one transaction data service; and
      a user interaction module to service user interactions, the user interaction module responsive to a user interaction request for master data retrieved via the master data service and responsive to a user interaction request with regard to transaction data via the at least one object service; and
   wherein the first data processing system and the second data processing system are deployed on opposite sides of a firewall and the first data processing system and the second data processing systems are instances of the same application except for transaction data services of their respective data access modules:
      the at least one transaction data service of the first data processing system configured to access transaction data via at least one data access service of the second data processing system; and
      the transaction data services of the second data processing system configured to access transaction data stored in at least one transaction data database.

2. The system of claim 1, wherein the first data processing system includes at least one additional module not included in the second data processing system, the at least one of an additional module to service interactions with at least one Internet-specific client-type.

3. The system of claim 1, wherein the data access call submitted to the data service of the second data processing system is a remote function call.

4. The system of claim 1, wherein generating the data access call that is submitted to the data service of the second data processing system includes adding data access credential data to a data set of the data access call that is submitted to the second data processing system.

5. The system of claim 1, wherein a user interaction request includes a request for data to be populated into and presented with a particular user interface, the user interaction module upon receipt of a user interaction request operable to generate a single object service call with regard to transaction data to be retrieved for presentation within the particular user interface, the called object service to make a single call of a second data processing system data service to retrieve the transaction data for presentation within the particular user interface.

6. A method performed by a first data processing system, the method:
   receiving, from a client application via a network, a call of a first user interaction service of a user interaction module requesting data to populate a client application user interface;
   calling a first object service to obtain the requested data;
   executing the called first object service, the executing including:
      calling a master data service to retrieve master data for the client application user interface from a local database storing master data copied from master data stored by a second data processing system, the master data being data that is not transaction data but is referenced by transaction data to give meaning to the transaction data;
      retrieving transaction data via a remote service call over a network from the second data processing system; and
      providing the retrieved master data and the transaction data to the user interaction module;
   transmitting, by the user interaction module, the data provided by the first object service to the client application; and
   wherein:
      a first data processing system that performs the method and the second data processing system are distinct instances of the same data processing system;
      the first data processing system and the second data processing system are deployed on opposite sides of a firewall;

the first data processing is configured to access transaction data stored in the second data processing system via remote service calls over the network; and the second data processing system is configured to access the transaction data stored by the second data processing system.

7. The method of claim 6, wherein the remote service call is a remote function call of a remote function present within the second data processing system.

8. The method of claim 6, wherein:
a user of the client application has been authenticated; and
the first object service is executable to:
generate a data structure to call the remote service, the data structure including a generic user credential; and
transmit the data structure via the network to the remote service of second data processing system.

9. The method of claim 6, further comprising:
receiving, from the client application, a second user interaction service call of another service including an update to the transaction data transmitted to the client application;
forwarding, to a second object service, at least a portion of the second user interaction service call including the update to the transaction data;
executing the second object service, the executing including calling a second remote service of the second data processing system to cause the updated data to be updated within the second data processing system.

10. The method of claim 6, wherein the first object service called is identified based on at least one of the called user interaction service, the requested data, and the client application user interface to be populated with data.

11. The method of claim 10, wherein a further user interaction service call requesting data to populate the client application user interface includes a data element indicating master data to be presented in the user interface has been cached by the client application to inform the first object service not to call the master data service and not to provide the master data to the user interaction module for transmission.

12. A non-transitory computer-readable medium, with instructions stored thereon, which when executed by at least one processor of at least one computer, cause the at least one computer to:
receive, from a client application via a network, a call of a first user interaction service of a user interaction module requesting data to populate a client application user interface;
call a first object service to obtain the requested data, the first object service identified based on at least one of the called user interaction service, the requested data, and the client application user interface to be populated with data;
execute the called first object service, the executing including:
calling a master data service to retrieve master data for the client application user interface from a local database storing master data copied from master data stored by a second data processing system, the master data being data that is not transaction data but is referenced by transaction data to give meaning to the transaction data;

retrieving transaction data via a first remote service call over a network from the second data processing system; and
providing the retrieved master data and the transaction data to the user interaction module; and
transmit, by the user interaction module, the data provided by the first object service to the client application; and
wherein:
a first data processing system that performs the method and the second data processing system are distinct instances of the same data processing system;
the first data processing system and the second data processing system are deployed on opposite sides of a firewall;
the first data processing is configured to access transaction data stored in the second data processing system via remote service calls over the network; and
the second data processing system is configured to access the transaction data stored by the second data processing system.

13. The non-transitory computer-readable medium of claim 12, wherein the first remote service call is a remote function call of a remote function present within the second data processing system.

14. The non-transitory computer-readable medium of claim 12, wherein:
a user of the client application has been authenticated; and
the first transaction data service is executable to:
generate a data structure to call the first remote service, the data structure including a generic user credential; and
transmit the data structure via the network to the first remote service of second data processing system.

15. The non-transitory computer-readable medium of claim 12, with further instructions stored thereon, which when executed by at least one processor of at least one computer, further cause the at least one computer to:
receive, from the client application, a second user interaction service call of another service including an update to the transaction data transmitted to the client application;
forward, to a second object service, at least a portion of the second user interaction service call including the update to the transaction data, the second object service selected based on at least one of the called user interaction service, the updated data, and the client application user interface within which the data was updated;
execute the second object service, the executing including calling a second remote service of the second data processing system to cause the updated data to be updated within the second data processing system.

16. The non-transitory computer-readable medium of claim 12, wherein the client application is a mobile device app and a further user interaction service call requesting data to populate the client application user interface includes a data element indicating master data to be presented in the user interface has been cached by the client application to inform the first object service not to call the master data service and not to provide the master data to the user interaction module for transmission.

* * * * *